(12) United States Patent
Rekonen et al.

(10) Patent No.: US 7,820,773 B2
(45) Date of Patent: Oct. 26, 2010

(54) OLEFIN POLYMERISATION CATALYST

(75) Inventors: Petri Rekonen, Porvoo (FI); Peter Denifl, Helsinki (FI); Timo Leinonen, Tolkkinen (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/302,770

(22) PCT Filed: May 31, 2007

(86) PCT No.: PCT/EP2007/004828

§ 371 (c)(1),
(2), (4) Date: Mar. 19, 2009

(87) PCT Pub. No.: WO2007/137849

PCT Pub. Date: Dec. 6, 2007

(65) Prior Publication Data

US 2009/0186994 A1    Jul. 23, 2009

(30) Foreign Application Priority Data

May 31, 2006    (EP)    .................. 06011266

(51) Int. Cl.
*C08F 4/44* (2006.01)
(52) U.S. Cl. .................................. 526/124.3
(58) Field of Classification Search ............... 526/124.3
See application file for complete search history.

(56) References Cited

U.S. PATENT DOCUMENTS

| | | | |
|---|---|---|---|
| 4,294,948 | A | 10/1981 | Toyota et al. |
| 4,517,307 | A | 5/1985 | Cuffiani et al. |
| 4,845,177 | A | 7/1989 | Vogt et al. |
| 5,413,979 | A | 5/1995 | Kostiainen et al. |
| 6,469,110 | B1 | 10/2002 | Harlin et al. |
| 6,703,455 | B1 | 3/2004 | Garoff et al. |
| 7,271,119 | B2 | 9/2007 | Denifl et al. |
| 2004/0242406 | A1 | 12/2004 | Denifl et al. |
| 2006/0166814 | A1 | 7/2006 | Leinonen et al. |

FOREIGN PATENT DOCUMENTS

| | | |
|---|---|---|
| EP | 0 083 074 | 7/1983 |
| EP | 0 887 379 | 12/1998 |
| EP | 1 273 595 | 1/2003 |
| EP | 1 403 292 | 3/2004 |
| WO | WO 00/08073 | 2/2000 |
| WO | WO 00/08074 | 2/2000 |
| WO | WO 03/000757 | 1/2003 |
| WO | WO 2004/029112 | 4/2004 |

OTHER PUBLICATIONS

European Search Report for corresponding Application No. EP 06011266.1 mailed Jan. 25, 2007.
International Search Report for corresponding Application No. PCT/EP2007/004828 mailed Aug. 21, 2007.
Written Opinion of the ISR for corresponding Application No. PCT/EP2007/004828 mailed Aug. 21, 2007.

*Primary Examiner*—Ling-Siu Choi
*Assistant Examiner*—Sonya Wright
(74) *Attorney, Agent, or Firm*—Knobbe Martens Olson & Bear LLP

(57) ABSTRACT

The present invention relates to particulate olefin polymerization catalyst components comprising an alkaline earth metal, a compound of a transition metal and an electron donor, characterized in that the catalyst particle size distribution of the catalyst component is essentially monomodal and has a SPAN value below 1.2, where SPAN is defined as: (Particle diameter at 90% cumulative size)−(Particle diameter at 10% cumulative size)/(Particle diameter at 50% cumulative size). The particulate olefin polymerisation catalyst components of the present invention are provided by a process which comprises preparing a solution of a complex of an alkaline earth metal and an electron donor by reacting a compound of said metal with said electron donor or a precursor thereof in an organic liquid reaction medium, reacting said complex in the solution form with a compound of a transition metal to produce a dispersion, wherein the dispersed phase predominantly contains the alkaline earth metal in said complex, and solidifying said dispersed phase to obtain said catalyst component, and is characterized in that a second organic liquid medium is added to the reactor after mixing the alkaline earth metal complex with the transition metal compound.

15 Claims, No Drawings

OLEFIN POLYMERISATION CATALYST

CROSS-REFERENCE TO RELATED APPLICATIONS

This application is the U.S. National Phase of International Application No. PCT/EP2007/004828 entitled OLEFIN POLYMERISATION CATALYST, filed May 31, 2007, designating the U.S. and published in English on Dec. 6, 2007 as WO 2007/137849, which claims priority to European Patent Application No. 06011266.1.

The invention relates to a particulate olefin polymerisation catalyst component comprising a alkaline earth metal, a transition metal and an electron donor and to a process for preparing same. The invention also relates to the use of such a catalyst component for preparing a catalyst, its use in the polymerization of alpha-olefins and to the polymers obtainable therefrom.

Ziegler-Natta (ZN) type polyolefin catalysts are well known in the field of polymers and generally comprise at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise further catalyst component(s), such as a cocatalyst(s) and/or an external donor(s).

Processes for the preparation of a catalyst components are described, for instance, in WO 00/08073 and WO 00/08074 and include usually a step in which a catalyst component comprising magnesium and a Group 4 metal is recovered by precipitation from solution, typically by contacting the solution with a large amount of an aliphatic hydrocarbon. However, such precipitation leads to a tar-like reaction product of low catalytic activity that needs to be washed several times in order to decrease the amount of inactive metal complex. Aromatic hydrocarbons have also been used for the precipitation, but they lead to a very finely divided precipitate which is difficult to deposit. It is also difficult to carry out such precipitation in a controlled and reproducible manner, leading to unsatisfactory product morphology. Moreover variable and low concentrations of catalyst constituents such as butyl chloride may result, as a consequence of precipitation evaporative removal of aliphatic solvent.

This unsatisfactory precipitation is avoided by the process for producing solid catalyst particles disclosed in WO 03/000757 and WO2004/029112 leading to an improved product having a more defined morphology and consistent product composition. However, the total yield of the production process of the catalyst is rather low and varies a lot, particularly when carried out in a bigger scale, i.e. in a pilot or full scale plant. In addition, the polymers obtainable by the use of the catalysts disclosed in the above references contain a rather large amount of undesirable fines and do exhibit only a medium narrow particle size distribution (PSD) which is dominated by the so-called replica effect, i.e. the polymer particles produced by using such a catalyst have an analogous PSD as found in the polymerization catalyst. Accordingly, broad catalyst PSDs yield relatively broad polymer PSDs upon polymerization.

Thus, it is the object of the present invention to overcome the disadvantages of the prior art and to provide an improved process for the production of a catalyst for the polymerisation of olefins that can be reproducibly obtained in high yields. Furthermore, it is the object of the present invention to provide catalyst particles which have a larger particle size and a narrow PSD. Accordingly, due to the replica effect, it is also the object of the present invention to provide polymers having a larger particle size and a narrower PSD.

This object has been achieved by the surprising finding that the time of addition of a solvent during the formation of the catalyst component comprising the alkaline earth metal and the transition metal is decisive to influence particle size distribution. Furthermore, the particle size, defined by median particle size and mode, of catalyst particles of the invention is higher than those of catalysts of the closest prior art. In addition, the catalyst prepared by the method of the invention have the activity at least on the same level or better than that of catalysts of prior art.

Thus, according to the present invention particulate olefin polymerisation catalyst components are provided by a process which comprises preparing a solution of a complex of an alkaline earth metal and an electron donor by reacting a compound of said metal with said electron donor or a precursor thereof in an organic liquid reaction medium, reacting said complex in the solution form with a compound of a transition metal to produce a dispersion, wherein the dispersed phase predominantly contains the alkaline earth metal in said complex, and solidifying said dispersed phase to obtain said catalyst component, and is characterized in that a second organic liquid medium is added to the reactor after mixing the alkaline earth metal complex with the transition metal compound.

According to the invention it is essential that said second organic liquid medium is added after said reaction of the metal complex with the transition metal compound. The use of a second organic liquid medium in a similar process is known from WO2004/029112. However, in WO2004/029112 said second organic liquid medium is present in the reaction mixture already during said reaction, and not added after mixing the alkaline earth metal complex with the transition metal compound.

Suitable compounds of a transition metal are compounds having a Group 4, 5 or 6 metal and preferably a compound having a Group 4 metal. In an alternative embodiment, the metal of the compound of a transition metal may also be selected from the group comprising Cu, Fe, Co, Ni and Pd. Preferably, the metal of the compound of a transition metal is titanium, hafnium or zirconium and most preferably titanium.

The transition metal of the compound of a transition metal may have any suitable oxidation state which will predominantly depend on the type of ligand employed. Preferred ligands are halides, such as fluoride, chloride, bromide and iodide, or organic ligands, such as alkoxylate, triflate, tosylate, mesylate, acetate, trifluoroacetate, or other organic ligands typically used in the field of single site catalysts.

The most preferred compound of a transition metal is titanium tetrachloride.

The alkaline earth metal is selected from magnesium, calcium, strontium or barium. Preferably, the alkaline earth metal is magnesium.

The compound of an alkaline earth metal employed in the preparation of a complex of an alkaline earth metal and an electron donor is not particularly limited as long as it is able to produce said complex by reacting with said electron donor or a precursor thereof. The alkaline earth metal of the compound of an alkaline earth metal may have any suitable oxidation state which will predominantly depend on the type of ligand employed. Preferred compounds of an alkaline earth metal include compounds wherein the oxidation state of the metal is +2, 0 or −2, such as the metal itself, alkaline earth metal halides, such as the halide salts of alkaline earth metals and in particular magnesium fluoride, magnesium chloride, magnesium bromide and magnesium iodide, alkaline earth metal alkyl, alkoxy and alkanoyloxy compounds, and alkaline earth metal hydrides such as magnesium hydride and calcium hydride. Suitable alkyl, alkoxy and alkanoyloxy ligands in alkaline earth metal alkyl, alkoxy and alkanoyloxy compounds include methyl, ethyl, n-propyl, isopropyl, n-butyl, tert-butyl, pentyl, hexyl, heptyl, octyl, methoxy, ethoxy, n-propoxy, isopropoxy, n-butoxy, tert-butoxy, pentoxy, hexoxy, heptoxy, octoxy, formiate, acetate, propionate and butanoate, and the like and mixtures thereof. Preferably, the metal in the alkaline earth metal alkyl, alkoxy and alkanoyloxy compound is magnesium.

In preferred embodiments the compound of an alkaline earth metal is a magnesium compound such as the group consisting of magnesium dialkoxides, complexes of a magnesium dihalide and a monohydric or polyhydric alcohol, and complexes of a magnesium dihalide and a magnesium dialkoxide.

In an alternative preferred embodiment, the compound of an alkaline earth metal is the reaction product of a monohydric or polyhydric alcohol with a magnesium compound selected from the group consisting of dialkyl magnesium compounds, alkyl magnesium alkoxides, alkyl magnesium halides and magnesium dihalides.

Preferred dialkyl magnesium compounds for the reaction with a monohydric or polyhydric alcohol include dialkyl magnesium compounds of the formula $R_2Mg$, wherein each of the two residues R is independently from the other selected from $C_1$-$C_{20}$ alkyl, preferably from $C_4$-$C_{10}$ alkyl. Especially preferred dialkyl magnesium compounds include ethylbutyl magnesium, dibutyl magnesium, dipropyl magnesium, propylbutyl magnesium, dipentyl magnesium, butylpentylmagnesium, butyloctyl magnesium and dioctyl magnesium. The stochiometry of the residues R may vary as is typical for Schlenk equilibria. The most preferred dialkyl magnesium compound is butyl octyl magnesium.

Preferred alkyl-alkoxy magnesium compounds are compounds of the formula RMgOR wherein each of the two residues R is independently from the other selected from $C_1$-$C_{20}$ alkyl, preferably from $C_4$-$C_{10}$ alkyl. Especially preferred alkyl-alkoxy magnesium compounds include ethyl magnesium butoxide, butyl magnesium pentoxide, octyl magnesium butoxide and octyl magnesium octoxide.

Preferred polyhydric alcohols are alcohols of the formula $R^a(OH)_m$, wherein $R^a$ is a straight-chain, cyclic or branched $C_2$ to $C_6$ hydrocarbon residue, (OH) denotes hydroxyl moieties of the hydrocarbon residue and m is an integer of 2 to 6, preferably 3 to 5. Especially preferred polyhydric alcohols include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, 1,2-catechol, 1,3-catechol and 1,4-catechol, and triols such as glycerol, methylol propane and pentareythritol. The polyhydric alcohol can be selected on the basis of the activity and morphology it gives to the catalyst component.

Preferred monohydric alcohols are alcohols of the formula $R^b(OH)$, wherein $R^b$ is a $C_1$-$C_{20}$, preferably a $C_4$-$C_{12}$, and most preferably a $C_6$-$C_{10}$, straight-chain or branched alkyl residue or a $C_6$-$C_{12}$ aryl residue. Preferred monohydric alcohols include methanol, ethanol, n-propanol, iso-propanol, n-butanol, iso-butanol, sec-butanol, tert-butanol, n-amyl alcohol, iso-amyl alcohol, sec-amyl alcohol, tert-amyl alcohol, diethyl carbinol, sec-isoamyl alcohol, tert-butyl carbinol, 1-hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol, 1-undecanol, 1-dodecanol, 1-tridecanol, 1-tetradecanol, 1-pentadecanol, 1-hexadecanol, 1-heptadecanol 1-octadecanol and phenol. The aliphatic monohydric alcohols may optionally be unsaturated, as long as they do not act as catalyst poisons. The most preferred monohydric alcohol is 2-ethyl-1-hexanol.

The electron donor is selected from aromatic, saturated and unsaturated dicarboxylic acid esters wherein the alcohol components of the diester are independently from each other selected from the above monohydric or polyhydric alcohols. Preferably, the alcohol components of the diester are selected from $C_2$-$C_{16}$ alkanols and/or diols. The electron donor is preferably an aromatic carboxylic acid ester, a particularly favoured ester being dioctyl phthalate and its isomers, in particular di(2-ethylhexyl)phthalate. The donor may conveniently be formed in situ by reaction of a dicarboxylic acid chloride or anhydride precursor with the above monohydric or polyhydric alcohols. Most preferably, the electron donor is di(2-ethylhexyl)phthalate formed in situ by reacting phthalic acid dichloride with 2-ethyl-1-hexanol.

Processes for preparing a solution of a complex of an alkaline earth metal and an electron donor by reacting a compound of said metal with said electron donor or a precursor thereof are known in the art. Preferably, the complex of an alkaline earth metal and an electron donor is prepared by reacting an alkoxy magnesium compound with a carboxylic acid halide precursor of the electron donor to form an intermediate in an organic liquid medium. Even more preferably, the alkoxy magnesium compound is formed in situ by the reaction of a suitable magnesium compound such as magnesium alkyls or hydrides with a monohydric or polyhydric alcohol as was described in more detail above.

Preferably, the organic liquid medium is selected from aromatic hydrocarbons.

Suitable aromatic hydrocarbons are $C_6$-$C_{10}$ aromatic hydrocarbons, such as substituted and unsubstituted benzenes, alkylated benzenes, toluene and xylenes, and mixtures thereof. Most preferably the organic liquid medium is toluene. The molar ratio of said aromatic medium to the alkaline earth metal is preferably less than 10, for instance from 4 to 10, preferably from 5 to 9.

In an alternative preferred embodiment, the organic liquid medium further comprises halogenated hydrocarbons, preferably in an amount sufficient to further improve catalytic activity.

Suitable halogenated hydrocarbons are those having the formula $R^cX_n$ wherein $R^c$ is an n-valent $C_1$-$C_{20}$ hydrocarbyl group, preferably a $C_1$-$C_{10}$ hydrocarbyl, X is a halogen and n is an integer from 1 to 4. Preferred examples of such chlorinated hydrocarbons include monochloromethane, dichloromethane, trichloromethane (chloroform), tetrachloromethane, monochloroethane, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane, 1-chloropropane, 2-chloropropane, 1,2-dichloropropane, 1,3-dichloropropane, 1,2,3-trichloropropane, 1-chlorobutane, 2-chlorobutane, isobutyl chloride, tert-butyl chloride, 1,4-dichlorobutane, 1-chloropentane, 1,5-dichloropentane. The chlorinated hydrocarbons may also be unsaturated, provided that the unsaturation does not act as catalyst poison in the final catalyst component. The most preferred halogenated solvents are 1,4-dichlorobutane and tert-butyl chloride.

In another alternative preferred embodiment, the organic liquid medium further comprises monohydric and/or polyhydric alcohols as described above in amounts which are not detrimental to the object of the present invention. The alcohols may be excess starting material from the formation of the above described reaction product of a monohydric or polyhydric alcohol with a magnesium compound, or the alcohols may be added separately before the addition of the second organic liquid medium.

The reaction conditions for the formation of the complex of an alkaline earth metal and an electron donor are not particularly limited. In a preferred embodiment, the reaction of the magnesium compound, carboxylic acid halide and mono- or polyhydric alcohol proceeds satisfactorily at temperatures in the range 20 to 80° C., preferably 50 to 70° C.

The obtained complex of an alkaline earth metal and an electron donor can optionally be isolated or directly used in solution in the subsequent reaction step(s). If the complex is isolated, the organic liquid medium in the subsequent reaction step(s) may be the same or different from the organic reaction medium employed for the formation of the complex. If the complex is not isolated, the composition of the organic liquid reaction medium may be altered by adding further solvents of the above described types to the organic liquid medium.

In an alternative preferred embodiment, the formation of the complex can also be conducted in combination with the subsequent reaction step(s).

The complex of an alkaline earth metal and an electron donor is reacted with a compound of a transition metal in solution to produce a dispersion wherein the dispersed phase predominantly contains the alkaline earth metal in said complex. The droplets of the dispersed phase are solidified to obtain said catalyst component.

The amount of the electron donor to Mg in the catalyst component is preferably one to four-fold the amount of Mg (wt-%), preferably 1.5 to 3-fold, more preferably 1.7 to 2.8-fold and most preferably 2.0 to 2.5-fold.

Preferably, the ratio of magnesium metal to titanium metal (mol/mol) in the feed in the above reaction is between 4-8 and most preferably between 5 to 7.

In a preferred embodiment of the invention, said complex of an alkaline earth metal and an electron donor is reacted with a compound of at least one transition metal at a temperature greater than 10° C. and less than 60° C., preferably greater than 20° C. and less than 50° C., to produce an dispersion, wherein said dispersion is composed of a dispersed phase which is insoluble in the mixture comprising the organic liquid medium and the transition metal compound and has a molar ratio of transition metal/alkaline earth metal of greater than 0.1 and less than 10 and a continuous phase which is less dense than the dispersed phase and has a molar ratio of transition metal/alkaline earth metal of 10 to 100.

The said continuous and dispersed phases are thus distinguishable from one another by the fact that the denser oil, if contacted with a solution of the transition metal compound in the organic liquid medium, will not dissolve in it. They are also distinguishable by the fact that the great preponderance of the alkaline earth metal provided (as complex) for the reaction with the transition metal compound is present in the dispersed phase, as revealed by comparison of the respective transition metal/alkaline earth metal mol ratios.

In effect, therefore, virtually the entirety of the reaction product of the alkaline earth metal complex with the transition metal—which is the precursor of the ultimate catalyst component—becomes the dispersed phase, and proceeds through the further processing steps to final, optionally dry, particulate form. The disperse phase, still containing a useful quantity of transition metal, can be reprocessed for recovery of that metal.

Since the two phases will naturally tend to separate into a lower, denser phase and supernatant lighter phase, it is necessary to maintain the reaction product as an emulsion by controlling the agitation of the dispersion and/or by adding an emulsion stabilizer and/or an optional turbulence minimizing agent (TMA). Furthermore, the dispersed phase of the dispersion, which can be either an emulsion or a suspension, can be adjusted in size by controlling the agitation of the dispersion and/or by adding an emulsion stabilizer and/or a turbulence minimizing agent (TMA).

For said emulsification surfactants, or stabilizers, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$-$C_{20}$ acrylates such as poly(hexadecyl)-methacrylate and poly(octadecyl)-methacrylate.

Furthermore, in some embodiments improved results can be obtained if a turbulence minimizing agent (TMA) is added to the reaction mixture. Preferably, the TMA is added to the reaction mixture when the emulsion is formed, but before solidification of the droplets of the dispersed phase starts in order to make sure that a quite uniform particle size distribution can be obtained.

Said TMA agent has to be inert under the reaction conditions and soluble in the reaction mixture under the reaction conditions, which means that preferably polymers without polar groups are preferred. In particular preferred are polymers of α-olefin monomers with 6 to 20 carbon atoms, most preferable is polydecene.

It has been found that the best results are obtained when the transition metal/alkaline earth metal mol ratio of the denser oil is 1 to 5, preferably 2 to 4, and that of the disperse phase oil is 45 to 75, preferably 55 to 65. Generally the ratio of the mol ratio transition metal/alkaline earth metal in the disperse phase oil to that in the denser oil is at least 10.

Solidification of the dispersed phase by heating is suitably carried out at a temperature of 70-150° C., usually at 90-110° C. The particles resulting from the dispersed phase of the dispersion are of a size, morphology (spherical shape) and uniformity which render the ultimate catalyst component extremely effective in olefin polymerisation. This morphology is preserved during the heating to solidify the particles, and of course throughout the final washing and drying steps.

The obtainable particle size is dependent on the size of the droplets of the dispersed phase and can be controlled by regulating the size of said droplets by controlling the agitation of the dispersion and/or by adding an emulsion stabilizer and optionally a turbulence minimizing agent (TMA), if needed. As can be seen from the results, the preparation method of the present invention tends to produce particles having bigger average particle size than obtained with the process of the basically same method, however, without using the specific improvement of the present invention.

It has been found by the present inventors that reproducible high yields, a uniform morphology, in particular a very narrow particle size distribution, as well as a bigger particle size of the particles of the catalyst component can be obtained by adding the second organic liquid medium to the reaction mixture after mixing the alkaline earth metal complex with the transition metal compound (i.e. in the emulsification step).

Without wishing to be limited by theory, it is believed that the second organic liquid medium improves the dispersion comprising the alkaline earth metal and the transition metal. It is further believed that the addition of said second organic liquid medium after mixing the alkaline earth metal complex with the transition metal compound decreases the solubility of alkaline earth metal compounds in the continuous phase and alters the interactions at the interphase of dispersed to continuous phase yielding the above mentioned beneficial effects.

In a preferred embodiment, the second organic liquid medium is added after the reaction step of said complex in the solution form with a compound of a transition metal has commenced.

In an alternative preferred embodiment, the second organic liquid medium is added after the reaction step of said complex in the solution form with a compound of a transition metal is substantially finished or just prior to the solidification step.

In yet another preferred embodiment, the second organic liquid medium is added in the solidification step.

Said second organic liquid medium comprises aliphatic hydrocarbons. Suitable aliphatic hydrocarbons include straight, branched or cyclic hydrocarbon chains having 5 to 8 C-atoms, preferably 6 to 7 C-atoms, in the hydrocarbon chain. The aliphatic hydrocarbons may further be substituted with aromatic or aliphatic rings. Preferably the aliphatic hydrocarbon is an aliphatic straight or branched chain hydrocarbon, such as pentane, hexane, heptane, octane or cyclohexane, or mixtures thereof. Preferred isomers of the above aliphatic hydrocarbons include n-pentane, n-hexane, n-heptane, n-octane, 2,2-dimethylpropane, 2-methylbutane, 2,2-dimethylbutane, 2,3-dimethylbutane, 2-methylpentane, 2-methylhexane, 2,2,4-trimethylpentane and 2-methylheptane. The most preferred aliphatic hydrocarbon is n-heptane.

The alkaline earth metal complex in solution form is contacted with the transition metal compound in the presence of the organic liquid medium used in forming the solution of the alkaline earth metal complex. According to the present invention the second organic medium is added after the mixing of the alkaline earth metal complex with the transition metal compound and is comprised predominantly of aliphatic hydrocarbon solvents as defined above. It is particularly preferred that the organic liquid medium present before the mixing of the alkaline earth metal complex with the transition metal compound is comprised predominantly of toluene, and that the aliphatic organic liquid medium added after the mixing of the alkaline earth metal complex with the transition metal compound is comprised predominantly of n-heptane.

The optimal amount of the second organic liquid medium (aliphatic solvent) added after the mixing of the alkaline earth metal complex with the transition metal compound is very much depending on the composition of the dispersion system, the type of aliphatic liquid medium and the reaction conditions and has to be adjusted in a narrow concentration window: If the amount is too low then the yield and/or catalyst properties are not significantly improved. If too much is added then uncontrolled precipitation occurs and the catalyst morphology is partly destroyed. In addition, this precipitation results in an undesired broadening of the particle size distribution due to fines formation.

A suitable method for determining the optimal amount of the part of the organic liquid medium added after the mixing of the alkaline earth metal complex with the transition metal compound is done by slowly adding small aliquots of the hydrocarbon to the dispersion. At the beginning of the addition the hydrocarbon does not cause any visible change in the optical appearance of the dispersion. The addition of hydrocarbon is continued in small aliquots until the addition causes the formation of a fine precipitate which is not dissolving even after several minutes of mixing. The formation of this precipitate can be easily detected, especially if mixing is stopped for a few seconds. The amount of hydrocarbon that is added before the first formation of such a stable precipitate is then the optimal amount that results in the highest obtainable catalyst yield without destroying catalyst morphology and affecting fines formation.

The recovered particulate product is washed at least once, preferably at least twice, most preferably at least three times with a hydrocarbon, which preferably is selected from aromatic and aliphatic hydrocarbons, preferably with toluene, particularly with hot (e.g. 80 to 100° C.) toluene, which might include a smaller or higher amount of $TiCl_4$ in it. The amount of $TiCl_4$ can vary from a few vol-% to more than 50 vol-%, such as from 5 vol-% to 50 vol-%, preferably to 30 vol-%. It is also possible that at least one wash is done with 100 vol-% $TiCl_4$. One or several further washes after aromatic and/or $TiCl_4$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene. The washing can be optimized to give a catalyst with novel and desirable properties. Finally, the washed catalyst component can be dried, as by evaporation or flushing with nitrogen or it can be slurried to an oily liquid without any drying step.

In a still preferred embodiment the catalyst component prepared by the method of the invention can contain an aluminium compound in order to obtain a catalyst with enhanced activity, especially at higher polymerisation temperatures. Said aluminium compound can be added at any stage of preparation of the catalyst. Preferably, the aluminium compound is added before the completion of the particle formation. The completion of the particle formation is usually achieved when the remaining toluene-soluble components have been washed out from the catalyst particles during solidifying said particles. Thus, the aluminium compound can be preferably added, in pure form or in the form of a solution, from shortly before the beginning of the dispersion formation until adding it to the washing liquid. It is most preferred to add the Al compound during the first washing step after solidification of the catalyst.

The aluminium compound is of general formula $AlR_{3-n}X_n$ wherein each R stands independently for a straight chain or branched alkyl or alkoxy group having 1 to 20, preferably 1 to 10 and more preferably 1 to 6 carbon atoms, X independently represents halogen and n stands for 0, 1, 2 or 3. The aluminium compound is added in such an amount that the final Al content of the particles is from <0.01 to 1%, preferably 0.05 to 0.8%, and most preferably 0.1 to 0.7%, by weight of the final catalyst particles. The most preferred Al content can vary depending on the type of the Al compound and on the adding step. E. g. in some cases the most preferred amount can be e.g. 0.1 to 0.4 wt-%. The aluminium compound is preferably selected from tri-$(C_1$-$C_6)$-alkyl aluminium compounds, or dialkyl$(C_1$-$C_6)$-halogen aluminium compounds, such as trimethylaluminium, triethylaluminium, methylalumoxane, tripropylaluminium, tributylaluminium, and diethylaluminiumchloride, with triethylaluminium and diethylaluminiumchloride being preferred, and diethylaluminiumchloride being most preferred The present invention further comprehends an olefin polymerisation catalyst comprising a catalyst component prepared as aforesaid, in association with a cocatalyst, and optionally with external donor(s).

Cocatalysts and/or external donors are added according to prior art usually to the actual polymerization or to the prepolymerisation step, if desired.

Conventional cocatalysts are alkyl aluminium cocatalysts, and are preferably tri-($C_1$-$C_6$)-alkyl aluminium compounds, or dialkyl($C_1$-$C_6$)-halogen aluminium compounds, such as trimethylaluminium, triethylaluminium, methylalumoxane, tripropylaluminium, tributylaluminium, and diethylaluminiumchloride, with triethylaluminium and diethylaluminiumchloride being preferred, and diethylaluminiumchloride being most preferred.

External donors are known in the art and are used as stereoregulating agent in propylene polymerisation. The external donors are preferably selected from hydrocarbyloxy silane compounds and hydrocarbyloxy alkane compounds. Typical hydrocarbyloxy silane compounds have the formula (3)

$$R^d{}_o Si(OR^d)_{4-o} \quad (3)$$

wherein $R^d$ is an α- or β-branched $C_3$-$C_{12}$-hydrocarbyl, $R^d$ a $C_1$-$C_{12}$-hydrocarbyl, and o is an integer 1-3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the alkoxy silane compound having the formula (3) is dicyclopentyl dimethoxy silane or cyclohexylmethyl dimethoxy silane.

Though the catalyst preparation according to the inventive method can be carried out batchwise, it is also preferable and possible to prepare the catalyst component semi-continuously or continuously. In such semi-continuous or continuous process, the solution of the complex of the alkaline earth metal and said electron donor, which is prepared by reacting the compound of said metal with said electron donor in an organic liquid medium, is mixed with at least one compound of a transition metal, which might be solved in the same or different organic liquid medium. The so obtained solution is then agitated, possibly in the presence of an emulsion stabilizer and/or TMA, followed by the addition of the aliphatic organic liquid medium added after the mixing of the alkaline earth metal complex with the transition metal compound and optionally further agitation before or during the so-agitated dispersion is fed into a temperature gradient reactor, in which the dispersion is subjected to a temperature gradient, thus leading to solidifying the droplets of a dispersed phase of the dispersion.

The solidified particles of the olefin polymerisation catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerisation reactor, so that a continuous preparation and fed to the reactor is guaranteed. As disclosed above, catalysts can be isolated and used as a catalyst-oil-slurry.

As it can be seen from the above description of the semi-continuous or continuous process, it is thus possible to use separated reaction vessels for the different process steps and to transfer the reaction products which are prepared in the respective reaction vessels and to fed them in-line into further reaction vessels for formation of the dispersion and, subsequently, of the solidified particles.

It is one possibility to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

The particulate olefin polymerisation catalyst component comprising an alkaline earth metal, a compound of a transition metal and an electron donor which is obtainable by the process of the present invention is characterized by being essentially monomodal and having a very narrow particle size distribution (PSD).

Particle size denotes the diameter of the particle. Monomodal PSD in this application denotes catalyst particles having a PSD curve (by Coulter Counter method) with only one maximum. Thus, catalyst with PSD having shoulders will be considered to be monomodal.

Essentially monomodal catalyst PSD denotes catalyst particles being monomodal in the range of 4 to 200 μm. This is because almost all measured samples contain some small amount of very small particles below 4 μm. These particles are apparently non-catalytic since these particles are not replicated in the polymer, but originate from oil used in the slurry formation.

Breadth of PSD is shown by the SPAN values. SPAN is calculated as follows:

SPAN=(Particle diameter at 90% cumulative size)–(Particle diameter at 10% cumulative size)/(Particle diameter at 50% cumulative size)

Particle diameters at 90%/10%/50% cumulative size are obtained directly from the Coulter Counter measurements. The term 90%/10%/50% cumulative size represents the particle size threshold at which 90%/10%/50% of the cumulated amount of particles are below that size.

Catalysts particles according to the invention have a narrow PSD. More specifically SPAN of the catalyst particles is below 1.2, preferably below 1.1 and still more preferably SPAN is 1.0 or below. SPAN values being even below 0.8 can be seen in the catalysts of the invention. Preferably, the SPAN value is in the range of 0.5 to 1.2, more preferably 0.6 to 1.1, even more preferably 0.65 to 1.0, still more preferably 0.7 to 0.9, and most preferably 0.75 to 0.85.

Further, the mode of the particles (particle diameter of the highest vol-%) and the median ($D_{50}$), i.e. half of the whole amount of particles is below this size and half is above this size, are shifted to bigger values compared to those of the closest prior art. Catalyst particles of the invention have mode preferably above 30 μm, more preferably above 35 μm, and still more preferably above 40 μm. Median of the catalyst particles is above 30 μm, preferably above 35 μm, and even more than 40 μm. Preferably, the mode of the catalyst particles of the invention are in the range of 30 to 70 µm, preferably 35 to 65 µm, more preferably 40 to 60 µm, even more preferably 40 to 55 µm, and most preferably 45 to 50 µm. Preferably, the median of the catalyst particles of the invention are in the range of 30 to 70 µm, preferably 35 to 65 µm, more preferably 40 to 60 µm, even more preferably 40 to 55 µm, and most preferably 45 to 50 µm.

Catalysts of the invention are obtainable by the process as described above.

The catalysts of the invention are used in polymerization of propylene optionally with comonomers selected from ethylene and/or other alpha-olefins of 4 to 10 carbon atoms. All generally known polymerization processes including solution, slurry and gas phase polymerization or any combinations thereof for producing polymer compositions can be used.

Slurry polymerisation is preferably a bulk polymerization, where monomer is used as a reaction medium.

Polymerisation can be carried out in a single or a multistage polymerisation process. Preferably polymerization is carried out in a multistage process using one or more polymerisation reactors, which may be the same or different, e.g. slurry and/or gas phase reactors or any combinations thereof. Each stage may be effected in parallel or sequentially using same or different polymerisation method. In case of a sequential stages each components may be produced in any order by carrying out the polymerisation in each step, except the first step, in the presence of the polymer component formed in the preceding step(s).

In a preferred process at least one component is produced by slurry process, preferably in bulk reactor. Bulk reactor is preferably a loop reactor. In one preferred multistage process a combination of at least one slurry reactor and at least one gas phase reactor is used. Additional gas phase reactors are possible.

A preferred multistage process is a "loop-gas phase"-process, such as developed by Borealis (known as BORSTAR® technology) described e.g. in patent literature, such as in EP 0887 379.

Optionally, the process can further comprise a prepolymerisation step before the actual polymerization step.

A continuous polymerisation process is preferred.

Preferably, the process is a multi (two) stage process as defined above, wherein the slurry polymerization is preferably carried out under the following conditions in a loop reactor:
  the temperature is within the range of 60° C. and 110° C., preferably in the range of 70-90° C.,
  the pressure is within the range of 20 bar to 80 bar, preferably between 30 bar to 60 bar,
  hydrogen can be added for controlling the molar mass in a manner known per se.

The reaction mixture from the slurry (bulk) reactor is transferred to the gas phase reactor, such as a fluidised bed reactor, where the conditions are preferably as follows:
  the temperature is within the range of 60° C. to 130° C., preferably between 70° C. and 100° C.,
  the pressure is within the range of 5 bar to 50 bar, preferably between 15 bar to 35 bar,
  hydrogen can be added for controlling the molar mass in a manner known per se.

The residence time can vary being e.g. in loop is in the range 0.5 to 5 hours, and in gas phase reactor 1 to 8 hours.

If desired, in slurry step supercritical conditions can be used.

Some preferred embodiments of the Invention are described, by way of illustration, in the following Examples.

Measurement Methods:

Particle Size and Particle Size Distribution:
  Coulter Counter LS 200 Particle Size Analyzer. n-Heptane as fluid.

Xylene Solubles, XS:
  2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks. The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
  $m_1$=weight of residue (g)
  $v_0$=initial volume (ml)
  $v_1$ volume of analysed sample (ml)
  Bulk density, BD: ASTM D 1895
  Melt Flow Rate, MFR: ISO 1133, at 230° C., 2.16 kg load Preparation of a Catalyst Component for the Polymerization of Olefins

REFERENCE EXAMPLE 1

Preparation of the Mg Complex

In a 165 l steel reactor 27.0 kg of 2-ethyl hexanol were added at 10° C. 78.0 kg of a 20% BOMAG A (Tradename) [Mg(Bu)1.5(Oct)0.5] solution in toluene were then slowly added to the well stirred alcohol. The temperature of the mixture was kept below 45° C. during the addition of BOMAG A. The reactants were allowed to react for 30 minutes at this temperature.

After addition of 7.8 kg of 1,2-phthaloyl dichloride, the reaction mixture was stirred at 60° C. for 60 minutes to ensure complete reaction. After cooling to room temperature a yellowish solution was obtained. The obtained Mg complex solution contained 2.2 wt-% of Mg.

EXAMPLES 1 TO 4

A 90-l reactor was charged with 32.00 kg TiCl$_4$, followed by 29.0 kg of the Mg complex solution according to Reference Example 1 and 1.24 kg Viscoplex® 1-254 (40 to 44% of meth/acrylic polymer in base oil) in toluene. Into this mixture 6.0 kg heptane was added and the mixture was reacted at room temperature (below 45° C.) for 40-60 minutes. The resulting emulsion was heated to 90° C. and reacted 30-45 minutes while stirring in order to solidify the particles forming the dispersed phase. After settling and syphoning the solids were washed and again settled and syphonated three times. Washings were done with 50.00 kg toluene containing 0.22 kg TEA (triethyl aluminium) at 90° C., with 50.00 kg heptane at 50° C. and with 50.00 kg heptane at 25° C.

After the last wash an oil (Primor oil, 4.0 kg) was added to the catalyst and the outtake was done as an catalyst oil slurry.

The above process was repeated 3 times. The results were very similar with regard to the particle size and the particle size distribution. Microscopy revealed that the particles were perfectly spherical in shape. The Coulter Counter analysis of the particle size revealed median particle size of 33 to 46 µm, mode of particles of 38 to 50 µm and a very narrow particle size distribution shown by SPAN being below 1.1. Total yields were high and varied only slightly, as shown below: All results are disclosed in Table 1.
Example 1: 93%
Example 2: 97%
Example 3: 72%
Example 4: 99%

COMPARATIVE EXAMPLES 1 TO 4

The catalyst was prepared using the same reactants with similar amounts as in the examples 1-4 of the invention. The procedure was identical to the procedure of Examples 1 to 4 with the exception that heptane was added into the reaction mixture before adding the Mg complex, i.e. the reactor was first charged with 6.00 kg of heptane, followed by 32.00 kg of TiCl$_4$ and 29.00 kg of the Mg complex solution according to Reference Example 1 and 1.24 kg Viscoplex®, 1-254.

The above process was repeated 3 times. Microscopy revealed that the particles were essentially spherical in shape. The Coulter Counter analysis of the particle size revealed median particle size of 16 to 25 μm, mode of particles of 20 to 29 μm and clearly broader particle size distribution than catalysts of the invention shown by span being above 1.29. Furthermore, fines formation was noted (particle size below 4 μm).

Relative yield were lower and varied quite a lot, as shown below:
Comparative Example 1: 55%
Comparative Example 2: 39%
Comparative Example 3: 39%
Comparative Example 4: 52%

As is evident from a comparison of Examples 1 to 4 with Comparative Examples 1 to 4, by the addition of the second organic liquid medium after mixing the alkaline earth metal complex with the transition metal compound the average yield of the catalyst can be increased from 52±18% to 90±14%. Accordingly, with the process of the present invention it is possible to produce the catalyst at much higher yields with a significantly decreased fluctuation of yield, a significant increase in median and mode particle size and a narrower PSD.

Results are disclosed in Table 1.

allowed to react for 5 minutes. Half of the mixture was added to the reactor and the other half was mixed with 19.4 mg of the catalyst component. After 10 minutes the catalyst/TEA/donor/pentane mixture was added to the reactor. 70 mmol hydrogen and 1400 g propylene were added into the reactor and the temperature was raised to 80° C. within 20 minutes while mixing. The reaction was stopped after 60 minutes at 80° C. by flashing out unreacted propylene with cooling. Results are disclosed in Table 2

TABLE 2

| | •Polymerisation results | | | | |
|---|---|---|---|---|---|
| Example | Polymerisation-temp. [° C.] | Activity [kgPP/gcath] | XS [w %] | BD [Kg/m$^3$] | MFR [g/10 min] |
| Comp 1 | 70 | 21.5 | 2.0 | 520 | 5.00 |
| Comp 2 | 80 | 29.3 | 2.2 | 510 | 8.70 |
| Comp 3 | 80 | 31.0 | 2.0 | 530 | 7.90 |
| Comp 4 | 80 | 33.6 | 1.7 | 540 | 6.60 |
| 1 | 70 | 25.1 | 1.9 | 520 | 5.90 |
| 1 | 80 | 33.6 | 1.9 | | 8.80 |
| 2 | 70 | 24.4 | 1.8 | | 6.50 |
| 3 | 70 | 20.2 | 1.7 | | |
| 4 | 70 | 22.5 | 1.8 | | 7.70 |
| 4 | 80 | 28.5 | 1.5 | | 7.80 |

The invention claimed is:

1. A particulate polymerisation catalyst component comprising an alkaline earth metal, a compound of a transition metal, an electron donor and an Al compound of general formula $AlR_{3-n}X_n$, wherein each R stands independently for a straight chain or branched alkyl or alkoxy group having 1 to 20 carbon atoms, X independently represents halogen and n stands for 0, 1, 2 or 3
   wherein the particle size distribution of the catalyst component is essentially monomodal and has a SPAN value below 1.2, where SPAN is defined as:

(Particle diameter at 90% cumulative size)−(Particle diameter at 10% cumulative size)/(Particle diameter at 50% cumulative size),

TABLE 1

CATALYST PREPARATION AND RESULTS

| Example | Heptane addition | Ti wt % | Al wt % | Mg wt % | DOP wt % | Yield [kg] | Relative Yield [%] | PS median [μm] | PS mode [μm] | D10 [μm] | D90 [μm] | SPAN |
|---|---|---|---|---|---|---|---|---|---|---|---|---|
| Comp 1 | First | 4.00 | 0.34 | 11.08 | 27.90 | 2.93 | 55 | 24.97 | 28.70 | 3.725 | 35.9 | 1.29 |
| Comp 2 | First | 6.71 | 0.65 | 10.36 | 10.36 | 2.40 | 39 | 18.36 | 21.69 | 2.913 | 26.73 | 1.30 |
| Comp 3 | First | 6.04 | 0.43 | 11.13 | 25.80 | 2.19 | 39 | 16.64 | 19.76 | 3.182 | 25.16 | 1.32 |
| Comp 4 | First | 3.76 | 0.28 | 11.48 | 22.81 | 2.89 | 52 | 18.64 | 21.69 | 3.903 | 27.87 | 1.29 |
| 1 | Last | 3.90 | 0.07 | 13.64 | 25.29 | 4.28 | 93 | 45.94 | 50.22 | 26.99 | 63.26 | 0.79 |
| 2 | Last | 3.98 | 0.06 | 12.62 | 27.34 | 4.83 | 97 | 37.88 | 41.68 | 14.52 | 55.82 | 1.09 |
| 3 | Last | 3.86 | 0.08 | 13.75 | 26.86 | 3.34 | 72 | 40.90 | 45.75 | 17.61 | 58.48 | 1.00 |
| 4 | Last | 4.25 | | 12.42 | 27.54 | 5.10 | 99 | 33.93 | 37.97 | 15.25 | 47.88 | 0.96 |

Relative yield is catalyst yield (kg)×Mg amount (wt-%) in the catalyst/Mg amount (kg) in the feed.

Polymerisation

Polymerization of propylene was done at 70° C. and/or 80° C. with the catalyst component in a 5 liter reactor with stirrer. Triethyl aluminium (TEA) (cocatalyst) (Al/Ti molar ratio 250), cyclohexyl methyl dimethoxy silane (external donor Do and Al/Do molar ratio 10) and 30 ml pentane were mixed and where the term 90%/10%/50% cumulative size represents the particle size threshold at which 90%/10%/50% of the cumulated amount of particles are below that size.

2. A particulate polymerisation catalyst component according to claim 1, wherein the SPAN value of the catalyst particle size distribution is in the range of 0.5 to 1.2.

3. A particulate polymerisation catalyst component according to claim 1, wherein the particles of the catalyst component have a median particle size of more than 30 μm and mode of more than 30 μm.

4. A particulate polymerisation catalyst component according to claim 1, wherein the particles of the catalyst component have a median particle size of 30 to 60 μm and mode of 30 to 65 μm.

5. A particulate polymerisation catalyst component according to claim 1, wherein the particles of the catalyst component have a median particle size of 40 to 50 μm, and mode of 40 to 55 μm.

6. A particulate polymerisation catalyst component according to claim 1, wherein the alkaline earth metal is magnesium.

7. A particulate polymerisation catalyst component according to claim 1, wherein the transition metal is a Group 4, 5 or 6 metal.

8. A particulate polymerisation catalyst component according to claim 1, wherein the transition metal is Ti, Cu, Fe, Co, Ni and/or Pd.

9. A particulate polymerisation catalyst component according to claim 1, wherein the compound of a transition metal is $TiCl_4$.

10. A particulate polymerisation catalyst component according to claim 1, wherein the electron donor is an aromatic carboxylic acid ester.

11. A particulate polymerisation catalyst component according to claim 1, wherein the electron donor is di(ethylhexyl) phthalate.

12. A particulate polymerisation catalyst component according to claim 1, wherein the Al content of the particles is from 0.1 to 0.7%, by weight of the catalyst particles.

13. A particulate polymerisation catalyst component according to claim 1,
wherein R stands independently for a straight chain or branched alkyl or alkoxy group having 1 to 10 carbon atoms.

14. A particulate polymerisation catalyst component according to claim 1, wherein R stands independently for a straight chain or branched alkyl or alkoxy group having 1 to 6 carbon atoms.

15. A particulate polymerisation catalyst component according to claim 1, wherein X independently represents chloride.

* * * * *